Figure 1:
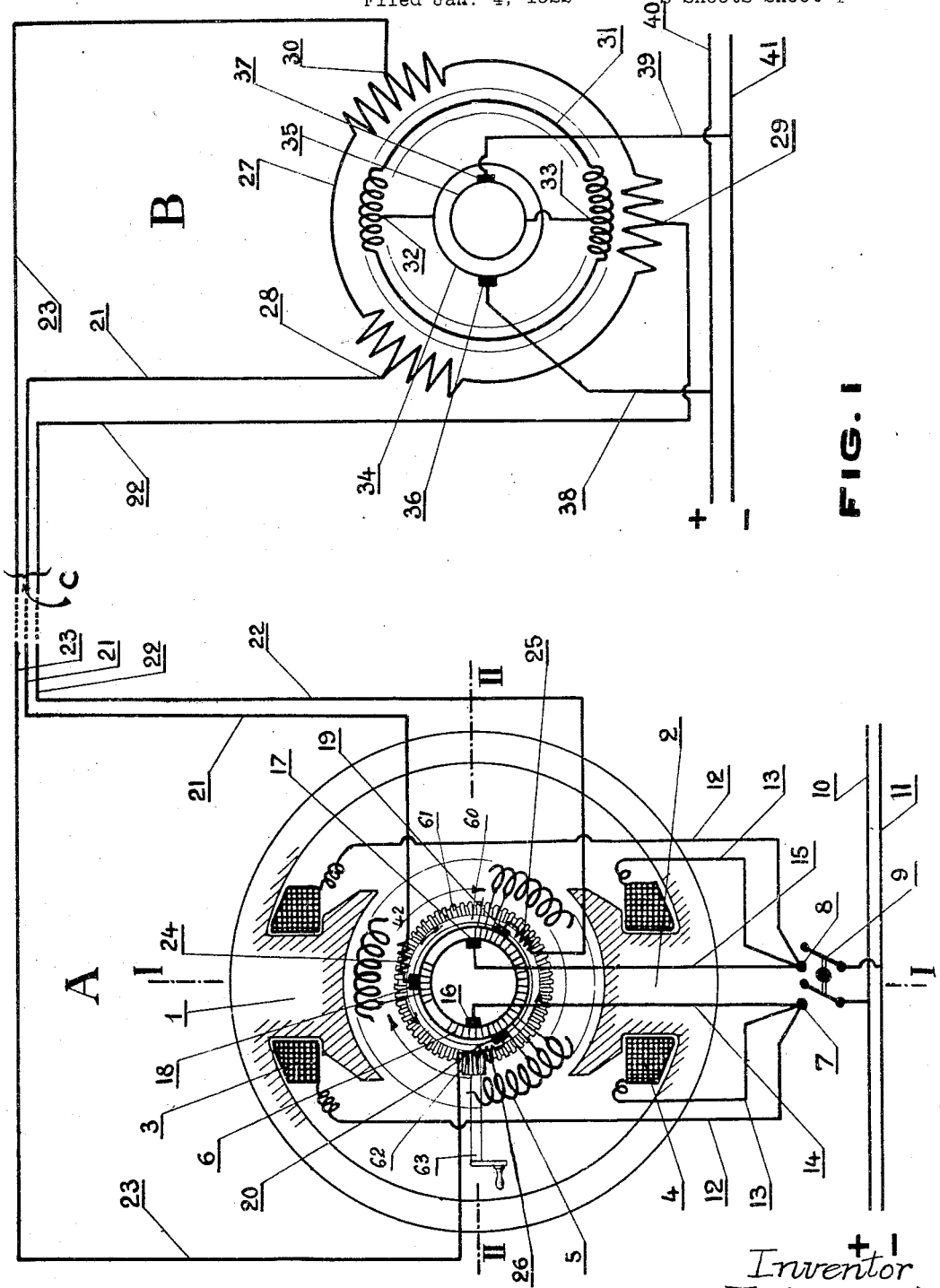

Dec. 29, 1925.  1,567,941
E. GRANAT
COMPLETE ELECTRIC DISTANT CONTROL APPARATUS
Filed Jan. 4, 1922  2 Sheets-Sheet 1

Inventor
E. Granat
by
Marks&Clerk
Attys.

Dec. 29, 1925.
E. GRANAT
COMPLETE ELECTRIC DISTANT CONTROL APPARATUS
Filed Jan. 4, 1922
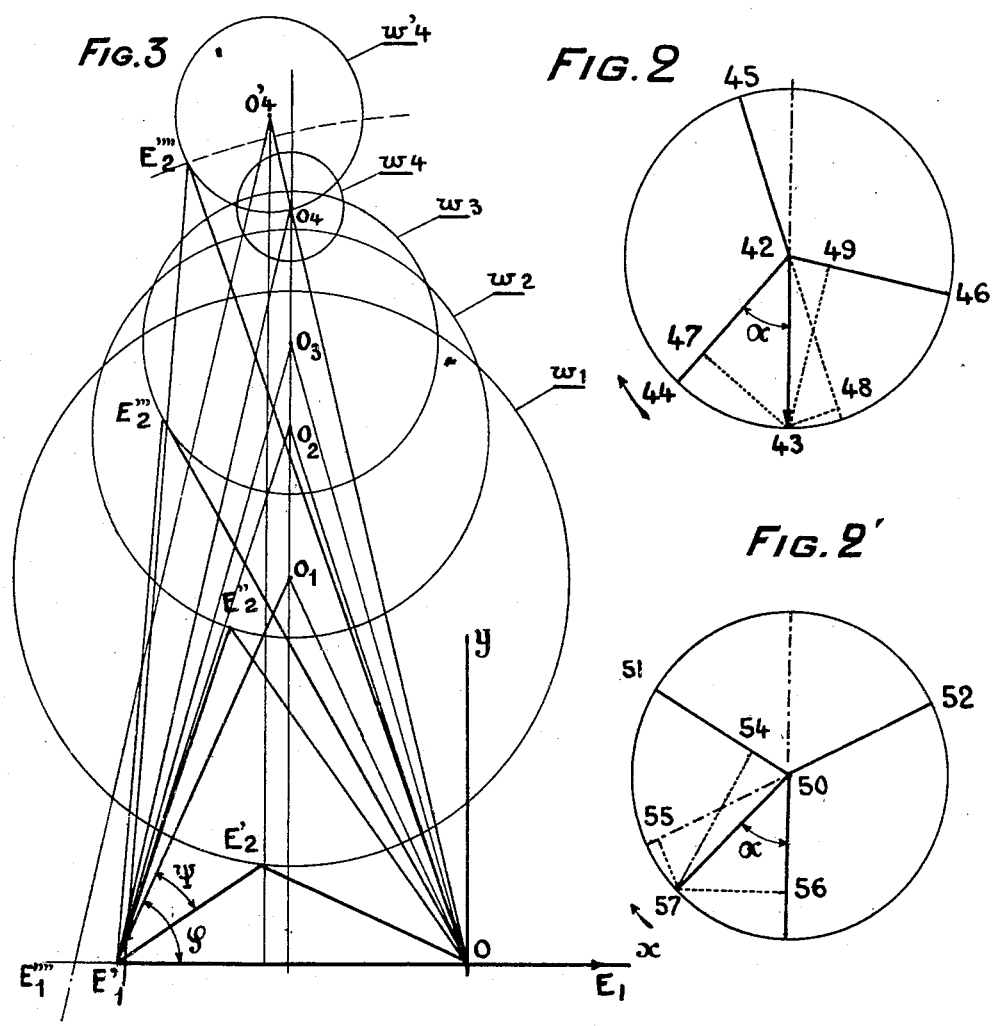
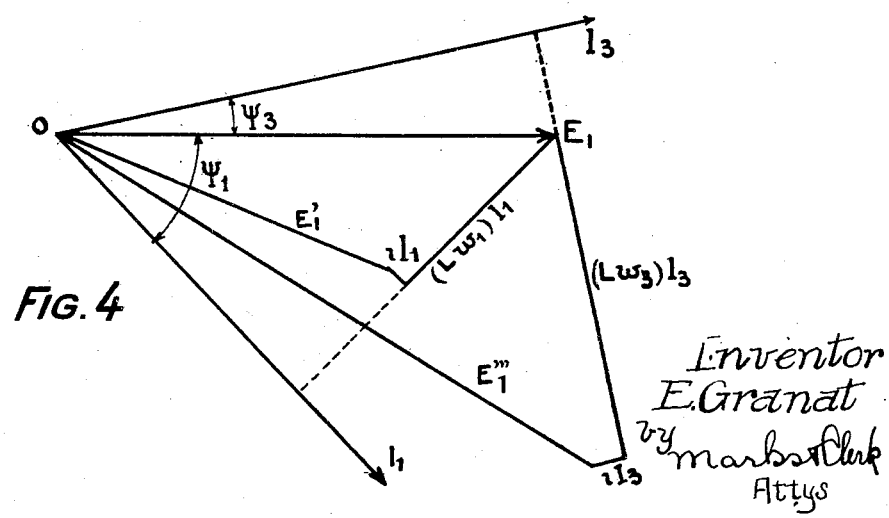
Inventor
E. Granat Patented Dec. 29, 1925.

1,567,941

UNITED STATES PATENT OFFICE.

ELIE GRANAT, OF PARIS, FRANCE.

COMPLETE ELECTRIC DISTANT CONTROL APPARATUS.

Application filed January 4, 1922. Serial No. 526,903.

*To all whom it may concern:*

Be it known that I, ELIE GRANAT, a citizen of the French Republic, and resident of 10 Rue Caumartin, Paris, France, have invented certain new and useful Improvements in Complete Electric Distant Control Apparatus, of which the following is a specification.

My invention relates to an electric distant control arrangement of the complete type, that is, wherein the rotation of the receiving apparatus is connected with that of the transmitting apparatus in an invariable relation in such manner that when the transmitting apparatus is rotated through a certain angle, the operator may be certain that the receiving apparatus has rotated through a corresponding angle which is previously determined, whereby the receiving apparatus may be disposed in any predetermined positions.

In the major part of the applications of devices of this class which may be herein considered, the speed of rotation of the receiving apparatus should vary within wide limits, from zero to the value corresponding to the maximum speed provided for the device under control. At all these various speeds, the distant control apparatus should maintain the same exactness of operation. These conditions are particularly necessary for the application of the complete distant control to artillery devices by reason of the constantly increasing speed of the target to be followed such as an aircraft, a torpedo boat, or the like, and also for the application on shipboard on account of the pitching and rolling of the vessel whereby it is required to give the pieces of artillery a movement in the contrary sense in order that they shall be constantly aimed at the target These essentially variable conditions make it necessary for the electric devices of the distant control apparatus to operate under particularly difficult conditions. In fact, the resitance couple of the apparatus to be actuated is substantially constant at all speeds whilst the power couple of a receiver of an electric distant control arrangement will usually vary with the speed in the known distant control apparatus, this power couple generally diminishes as the speed rises, and thus at a certain speed the couple becomes insufficient and the armature will fall out of step with the field of the electric receiver.

The device according to my invention has for its principal object to afford a partial remedy for this serious drawback by extending the usual range of operation of complete distant control apparatus. It is supplied by a source of continuous current (this form of current being adopted in the major part of the installations employing distant control apparatus), and it makes use of special dispositions whereby all excessive heating of the said apparatus is avoided in spite of the reduced size of the same.

The arrangement comprises a transmitter and a receiver which are connected by a line circuit. The transmitter consists of an electric machine of the known type having a fixed field, an armature with commutator provided with fixed brushes for a continuous current supply, and a brush-holder device carrying brushes and revoluble about the said commutator; these revoluble brushes are connected to the line wires of the distant control device to which is supplied, upon the rotation of the brushes, a polyphase current whose frequency depends upon the speed of rotation of the said brushes. This machine acts at the same time as a commutating apparatus and a transformer of frequency. The receiver is an autosynchronous motor whereof the stator is supplied by the revoluble brushes of the transmitter and the rotor with closed winding is supplied with continuous current at two opposite points. The flux thus produced in the rotor (the direction of this flux being fixed with reference to the rotor body) follows the rotating flux set up in the stator. The actuated device is controlled by this rotor.

The receiver may also be constituted by an apparatus of the same kind as the transmitter above described, by employing the following devices. The continuous current supply of the armature is obviated and the revoluble brushes are now secured to the shaft and are thus in fixed position with reference to the commutator. The said brushes are supplied with polyphase current from the transmitter to which this new receiver is connected, and when thus transformed the latter will act as an auto-synchronous motor.

Various details of the said complete electric distant control device will be set forth hereunder.

The following description, together with the accompanying drawings, which are given by way of example, set forth a form of construction of the said complete electric distant control, with diagrams showing the operation of the same, wherein:

Figure 1 is a general view of the arrangement. Figs. 2 and 2' constitute a diagram showing the method of complete control. Figs. 3 and 4 are diagrams showing the advantages to be obtained by the present device.

Fig. 1 is a general view of the arrangement. Figs. 2 and 2' are diagrammatic views showing the coupling method. Figs. 3 and 4 are diagrams setting forth the advatages afforded by the arrangement adopted.

In Fig. 1, A is the transmitter, B the receiver and C the line connecting the same. The transmitter A comprises a field constituted by the poles 1, 2 and the field coils 3, 4, together with an armature provided with a commutator 6. The terminals 7, 8 are supplied through the switch 9 by the wires 10, 11 of a continuous current electric line. From the said terminals 7, 8 start the wires 12, 13 and 14, 15 supplying respectively the field coils 3, 4 and the stationary brushes 16, 17 of the commutator 6. Around the commutator 6 is mounted upon a movable device 60, a set of three equally-spaced brushes 18, 19, 20 connected to three line wires 21, 22, 23 through the self-induction coils 24, 25, 26 which are preferably also mounted upon the movable brush-holder device. The use of the said coils will be explained hereunder. The movable device 60 is provided with a gear 61 meshing with a pinion 62 on the crank shaft 63.

The receiver B comprises a stator 27 constituted by a closed winding to three equally-spaced points whereof 28, 29, 30 are connected the three line wires 21, 22, 23.

The rotor 31 is provided with a winding in closed circuit. Two opposite points of the said winding, 32, 33 are connected to two collector rings 34, 35 co-operating with the stationary brushes 36, 37 which are connected by the wires 40, 41 to a continuous current line.

It is easy to demonstrate that the present arrangement will afford a distant control which is in complete co-operation, that is, by causing the transmitter element carrying the three brushes 18, 19, 20 to rotate through a certain angle, the rotor 31 of the receiver will rotate through exactly the same angle. In fact, when the switch 9 is closed, the armature of the transmitter A which operates as a continuous current motor will rotate at a constant speed. By rotating around the commutator 6 in the direction of the arrow 42 a brush 18 it is observed that the potential will be zero in the position 18 Fig. 1 (upper position in the middle plane), will rise as far as the horizontal plane II, and then fall to zero when passing through the middle plane, these variations taking place substantially according to a sinusoid, since this potential depends upon the degree of inclination of the armature turn in contact with the brush with reference to the constant flux in the vertical sense, Fig. 1, passing through the said turn. If therefore we represent, Fig. 2, by the vector 42, 43 this flux in magnitude and direction, and by the three equidistant axes 44, 45, 46 revoluble on 42, a given position of the three brushes 18, 19, 20, the potentials of these three brushes will be proportional to the vectors 47, 48, 49 determined by the projections of the flux vector 43 upon these three axes. For each angle α made by the combination of the three movable axes with the fixed vector 43, we will obtain a well-determined group of values of the three projections 47, 48, 49. Considering what takes place in the receiver B, it is observed that the stator is supplied at three equidistant fixed points 28, 29, 30 connected to the three movable brushes 18, 19, 20. If therefore we draw, Fig 2', around the point 50 three fixed equidistant axes 51, 52, 53 corresponding to the three supply points 28, 29, 30 of the stator, and if we project upon these axes the vectors 54, 55, 56 respectively equal to the projections 49, 48, 47 of the flux vector 43 upon the three movable axes 46, 45, 44, these three vectors will be the components of a vector 57 which represents in magnitude and direction the flux of the rotating magnetic field set up by the stator 27. This movable vector 57 will make with one of the axes of its combination of fixed axes 51, 52, 53 the same angle α as is made by the combination of movable axes 44, 45, 46 with the fixed vector 43. It will be observed that the rotor 31, which follows the rotation of the stator field 27 direction of which is represented by the vector 57, will move through exactly the same angle α representing the angular displacement given to the transmitter device carrying the revoluble brushes 18, 19, 20.

In this arrangement it is to be remarked that by reason of the permanent rotation of the armature 5 of the transmitter A, the actual consumption of the transmitting post will be limited to the very small power represented by the no-load losses of the said continuous current motor such as friction, heat effects of the current, and the like, whence it will result that the armature heating of the transmitter armature will be very small, and the post may be given a small size, this being especially advantageous in the case of a limited available space such as in the conning tower of a battleship or in submarines.

It is also to be noted that the use in the rotor of the receiver of a closed winding supplied with continuous current at two opposite points affords a considerable advantage from the fact that if for any reason (such for instance as an additional momentary load occasioned by the actuated apparatus) the motion of the rotor is retarded with reference to the motion of the rotating flux of the stator, the fact of this slip will in itself produce in the rotor winding an induced flux which is superposed upon the direct flux produced by the continuous current, and this will act to increase the torque of the rotor, thereby overcoming the momentary load without losing step.

The operation of the said distant control arrangement from an electrical standpoint may be set forth as follows:

The transmitter acts as a commutating device of a special type with variable frequency in spite of the constant speed of the armature. The receiver acts as a three phase auto-synchronous motor speed of which is variable over a very wide range.

In conformity with the usual conventions adopted in the study of synchronous motors we will designate by:

$E_1$, the electro-motive force at the brushes 18, 19, 20 of the commutating device, $\omega$ the speed of rotation of the receiver, C, the resistance couple to be overcome in order to operate the actuated device, $P = C\omega$, the mechanical power required of the receiver, $l$, the coefficient of self-induction total and fictitious, of the circuit of the distant control arrangement, $r$, the resistance, total and fictitious of this circuit.

The following will then be obtained:

$$\tan \varphi = \frac{l\omega}{r},$$

$\varphi$ being the total phase-difference of the circuit.

If $OE_1$, Fig. 3, is the vector which represents in magnitude and direction the constant electro-motive force at the brushes of the commutator device, we may draw according to $OE'_2$ the vector representing in magnitude and direction the electro-motive force produced in the rotor of the receiver, this vector being variable according to the operating conditions. When the speed is given and the resistance couple C is varied, the locus of the point $E'_2$ is a curve designated as characteristic curve, this curve is a circle whose centre $O_1$ has the co-ordinates.

$$(1) \quad x = \frac{-E_1}{2}$$

$$(2) \quad y = \frac{\omega E_1}{2} \tan \varphi$$

and the value of the radius will be $$(3) \quad R = \frac{1}{\phantom{xx}} \sqrt{E^2_1 - 4P r}$$

If we locate the point $E'_1$ which is symmetrical with $E_1$ with reference to O, the angle $O_1 E'_1 O$ is equal to $\varphi$; and the angle $O_1 E'_1 E'_2$ represents the angle $\psi$ of phase-difference between the current and the electro-motive force $E_1$ in the commutating device.

But in order to observe the working of the said co-operating distance control arrangement in the applications wherein it is employed, it must be supposed that as above stated and contrary to what usually prevails for synchronous motors the resistance couple applied to the rotor of the receiver is substantially constant whilst the speed will vary over a considerable range.

For each speed $\omega_1$, $\omega_2$, $\omega_3$, $\omega_4$ etc., the characteristic will be a different circle. If the speed increases that is, if $\omega_1 < \omega_2 < \omega_3 < \omega_4$ etc., $P = C\omega$ will increase and $\varphi$ will increase since $$\tan \varphi = \frac{l\omega}{r}$$

and therefor the ordinate $$y = \frac{-E_1}{\omega^2} \tan \varphi$$

will increase in absolute value, whereas the radius R (see equation 3) will diminish. The circle $\omega_1$, $\omega_2$, $\omega_3$, $\omega_4$ etc., corresponding to increasing speeds and hence to increasing power values, will keep on diminishing and will recede from the axis ox. At the same time the counter electro-motive force $OE'_2$ set up in the rotor of the receiver whose stator excitation is constant, will increase in proportion to the speed $\omega$. A moment will occur at which this vector will cease to intersect the corresponding circle $\omega$ which keeps on diminishing and the motor will fall out of step. This latter effect taking place at a certain speed is thus due to the inherent nature of the apparatus, and consequently in order to afford a reliable operation of the said distant control apparatus at different speeds, it is required for each speed to vary the voltage at the terminals of the commutator device as well as the excitation of the receiver. But this method, even though excellent in theory is unavailable in practice.

In the apparatus according to this invention, a satisfactory result is obtained by the addition of three small self-induction coils 24, 25, 26 for partially compensating the prejudicial effect of the increase of speed causing the receiver to fall out of step. By making this addition, we are enabled to increase as far as may become necessary in practice the maximum operating speed of the distant control apparatus, as will be set forth in the following theoretical considerations.

It is observed that in the diagram of the bi-polar characteristic, Fig. 3, the angle $O_1$ sign (according to its position to the right or left of $E_1 O_1$) the angle $\psi$ of phase-difference between the current I and the constant E. M. F. $E_1$ of the commutator apparatus. This angle, Fig. 3, is situated to the right for slow speeds such as $\omega_1$, and hence the current will lag. The diagram Fig. 4 shows in the known manner the relation between the constant E. M. F. $E_1$ at the brushes 18, 19, 20 of the commutator and the fall of potential due to the inductance L and the resistance $r$ of the self-inductance coils 24, 25, 26, that is:

1.—($L\omega_1$) $I_1$ is the fall of potential due to the self-induction L of the said coils, represented by a vector drawn from the end of $E_1$ and the perpendicular to $OI_1$ which represents the current, this having an angle of lag $\psi_1$ with reference to the E. M. F. $E_1$.

2.—$rI_1$ is the fall of potential due to the ohmic resistance $r$ of the self-induction coils, represented by a vector drawn through the end of the last-mentioned vector and parallel to $OI_1$.

The tension at the ends of the coils will therefore be represented by the vector $OE'_1$ which is smaller then $E_1$ in this manner the tension at the ends of the coils is somewhat under that at the brushes 18, 19, 20. The effect of the coils would thus appear prejudicial, but the resulting diminution in the ordinate of the circle and its radius is not dangerous, by reason of the wide margin of safety for the operating speed near $\omega_1$ which has a small value. For certain speeds $\omega_2 > \omega_1$ the angle $\psi$ will become zero (Fig. 3); the current $I_2$ is now in phase with the E. M. F. $E_1$ of the commutating device; the effect of the self-induction coils is null. For a speed of still greater value $\omega_3$ adjacent to the speed at which the machine would fall out of step, the angle $\psi_3$ is situated to the left $E'_1 O_3$; the current $I_3$ is in the lead upon the E. M. F. $E_1$ of the commutating device. The diagram Fig. 4 is established for a speed $\omega_3$ corresponding to an angle $\psi_3$ and for a lead of the current upon the E. M. F., and shows in this case that the tension at the ends of the coils 24, 25, 26 is $E'''_1 > E_1$. This is still more evident for the speed $\omega_4$ which would cause the machine to fall out of step in the absence of the self-induction coils 24, 25, 26. In Fig. 3 and the equations 1, 2, 3 should we replace $E_1$ by $E''''_1$ which is greater, we would obtain an increase in the radius of the circle $\omega_4$ which would become $\omega'_4$; the vector $OE''''_1$ will again intersect this circle and the operation of the apparatus will again become feasible. In this manner we increase the maximum operating speed of the apparatus.

The self-induction coils 24, 25, 26 may be either stationary or secured to the brushes 18, 19, 20, that is, mounted upon the same device and moved by the rotation of the latter. In this case they may be used as blow-out coils for the sparks occurring at the brushes when passing from one commutator strip to another, thereby further increasing the efficiency of the apparatus.

Having now particularly described and ascertained the nature of my said invention and in what manner the same is to be performed, I declare that what I claim is:

1. In a complete distant control apparatus the combination of: direct current line wires, a transmitting machine comprising a stationary field member fed by the direct current line wires and an armature, a commutator provided on said armature, fixed brushes rubbing on said commutator and fed by the direct current line wires, movable brushes rubbing on the commutator, a rotating support whereon are fixed said movable brushes, means for actuating said rotating support, self induction coils each connected to one of the rotating brushes, transmitting line wires connected respectively to the said self induction coils, a receiving motor comprising a stator fed by the said transmitting line wires and a rotor, and a closed winding provided on the rotor and fed at two opposite points by the direct current line wires.

2. In a complete distant control apparatus the combination of: direct current line wire, a transmitting machine comprising a stationary field member fed by the direct current line wires and an armature, a commutator provided on said armature, fixed brushes rubbing on said commutator and fed by the direct current line wires, movable brushes rubbing on the commutator, a rotating support whereon are fixed said movable brushes, means for actuating said rotating support, self induction coils each connected to one of the rotating brushes and secured on the movable support next to said brush, transmitting line wires connected respectively to the said self induction coils, a receiving motor comprising a stator fed by the said transmitting line wires and a rotor, and a closed winding provided on the rotor and fed at two opposite points by the direct current line wires.

In witness whereof I have hereunto set my hand.

ELIE GRANAT.